United States Patent [19]

Suzukawa et al.

[11] 4,366,257
[45] Dec. 28, 1982

[54] PROCESS FOR PRODUCING A CALCIA CLINKER

[75] Inventors: Yuichi Suzukawa; Waichi Kobayashi; Satoshi Ohtaka, all of Ube, Japan

[73] Assignee: Ube Industries, Ltd., Yamaguchi, Japan

[21] Appl. No.: 269,882

[22] Filed: Jun. 3, 1981

[51] Int. Cl.³ .............................................. C04B 35/02
[52] U.S. Cl. .................................... 501/123; 501/125
[58] Field of Search ................ 501/123, 125; 423/267, 423/637, 638

[56] References Cited

U.S. PATENT DOCUMENTS

| 265,073 | 0/1882 | Henderson | 501/123 X |
|---|---|---|---|
| 1,614,525 | 1/1927 | Hilbish | 501/28 |
| 2,076,883 | 4/1937 | Ernould | 501/123 |
| 2,528,471 | 12/1946 | Fisk | 501/123 |
| 2,678,887 | 5/1954 | Hathaway | 501/123 X |
| 3,026,211 | 3/1962 | Cutler | 501/123 X |

FOREIGN PATENT DOCUMENTS

| 1013563 | 8/1957 | Fed. Rep. of Germany | 501/123 |
|---|---|---|---|
| 1328047 | 4/1963 | France | 501/123 |
| 50-14709 | 2/1975 | Japan . | |
| 52-53908 | 4/1977 | Japan . | |
| 53-55311 | 5/1978 | Japan . | |
| 520829 | 5/1940 | United Kingdom | 501/123 |

*Primary Examiner*—Helen M. McCarthy
*Attorney, Agent, or Firm*—Burgess, Ryan and Wayne

[57] ABSTRACT

A calcia clinker having an excellent resistance to slaking and an enhanced modulus of rupture at elevated temperatures is produced by a process comprising the steps of: (1) calcining a lime material at a temperature of 800° to 1300° C. to prepare a calcia; (2) providing an admixture, in the form of fine particles having a specific surface area of 5000 cm²/g or more, of the calcia with an additive comprising (A) 0.5 to 3%, in terms of oxide and based on the weight of CaO in the calcia, of at least one inorganic compound of an element selected from the group consisting of titanium, aluminum and silicon and (B) 0.5 to 2.0%, based on the weight of CaO in the calcia, of calcium fluoride; and sintering the above-mentioned compound (A), and; (3) sintering the admixture at a temperature of 1200° to 1650° C.

6 Claims, No Drawings

, 257

PROCESS FOR PRODUCING A CALCIA CLINKER

FIELD OF THE INVENTION

The present invention relates to a process for producing a calcia clinker. More particularly, the present invention relates to a process for producing a calcia clinker useful as a refractory material having an excellent resistance to slaking and an enhanced modulus of rupture at elevated temperatures.

BACKGROUND OF THE INVENTION

It has been expected that calcia would be useful as a refractory material for a steel-making furnace, a ladle and a cement-kiln, because calcia exhibits an extremely high melting point of about 2580° C., an excellent resistance to basic slag and superior dephosphorizing, desulfurizing and deoxidizing properties. However, calcia has disadvantages in that, when placed in an ambient atmosphere, a conventional type of calcia absorbs the moisture in the ambient atmosphere and is pulverized due to the reaction shown below and, finally, is decomposed.

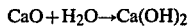

$$CaO + H_2O \rightarrow Ca(OH)_2$$

That is, conventional calcia exhibits an extremely poor resistance to slaking. The slaking phenomenon causes the mechanical strength of the calcia to decrease. Therefore, it is difficult to utilize conventional calcia in a practical industrial use and it is difficult to store it without the quality being degraded.

Various attempts as indicated below, were made to eliminate the above-mentioned disadvantages from the calcia.

(1) A method in which a lime material is melted at a temperature higher than the melting point of CaO.

(2) A method in which a lime material is sintered at an elevated temperature.

(3) A method in which an additive is admixed with a lime material.

In method (1), a calcia is mixed with a small amount of $SiO_2$ and/or $Fe_2O_3$, the mixture is melted at a temperature of 3000° C. or more for several hours and the melt is used for producing a desired refractory material. This method is disclosed in Japanese Patent Application Publication No. 50-27203 (1975).

In the method (2) which is disclosed by Japanese Patent Application Laid-open No. 52-53908 (1977), a calcia is heated at a temperature of 1600° C. or more, but not exceeding the melting point of the calcia, for 2 hours or more, and the heated calcia is cooled at a cooling rate of 100° C./hr or less to provide a particulate calcia clinker in which the calcia crystals have a diameter of 5 microns or more.

In method (3) which is disclosed in Japanese Patent Application Laid-open Nos. 53-55311 (1978) or 50-14709 (1975), a calcia is mixed with 0.4 to 1.3 molar % of $Fe_2O_3$ or a mixture of a calcia with 2 to 10% by weight of $Fe_2O_3$ and $TiO_2$ is sintered.

However, in method (1), the calcia is heated at an extremely high temperature, higher than the melting point of the calcia, with a large consumption of heat energy. Therefore, this method (1) is high in cost and is not adequate for mass production of the calcia clinker. Also, the resultant calcia clinker exhibits an unsatisfactory resistance to slaking.

In method (2), the burning procedure is carried out at an elevated temperature of 1600° C. or more over a long time period with a great consumption of heat energy. The cooling procedure must be carried out at a limited cooling rate to produce a calcia clinker having a good quality. Therefore, a usual rotary kiln is not adequate for the calcining and cooling procedures. Also, the quality of the resultant calcia clinker is still unsatisfactory.

In method (3), the burning temperature for a lime material must be carried out at a very high temperature and the resultant calcia clinker containing $Fe_2O_3$, etc. and/or $TiO_2$ exhibits an unsatisfactory modulus of rupture and resistance to corrosion.

SUMMARY OF THE INVENTION

An object of the present invention is to provide a process for producing a calcia clinker having an excellent resistance to slaking and an enhanced modulus of rupture at elevated temperatures.

Another object of the present invention is to provide a process for producing a calcia clinker at a relatively low cost.

The above-mentioned objects can be attained by the process of the present invention which comprises the steps of:

calcining a lime material comprising mainly at least one inorganic calcium compound at a temperature of from 800° to 1300° C. to provide a calcia;

preparing an admixture of (1) said calcia and (2) an additive comprising (A) 0.5 to 3% by weight, in terms of oxide and based on the weight of CaO contained in the calcia, of a first component consisting of at least one inorganic compound containing an element selected from those in Groups III and IV in the Periodic Table and (B) 0.5 to 2% by weight, based on the weight of CaO contained in the calcia, of a second component consisting of at least one member selected from the group consisting of (a) calcium fluoride and (b) inorganic compounds each having an element selected from those in Groups III and IV in the Periodic Table and being different from that of the first component, the admixture being in the form of fine particles having a specific surface area of 5,000 $cm^2/g$ or more determined by the Blaine permeability method, and;

sintering the admixture at a temperature of from 1200° to 1650° C.

DETAILED DESCRIPTION OF THE INVENTION

In the process of the present invention, a calcia is produced from a lime material by calcining it at an elevated temperature of from 800° to 1300° C.

The lime material comprises mainly at least one inorganic calcium compound such as $CaCO_3$ and $Ca(OH)_2$. That is, the lime material may be selected from limestone, slaked lime and mixtures thereof. In view of the quality of the resultant calcia clinker, it is desirable that the content of harmful substances, such as alkali oxides, for example $Na_2O$ and $K_2O$, $Fe_2O_3$, sulfur and phosphorus in the lime material is as small as possible.

The calcining temperature for the lime material should be within the range of from 800° to 1300° C., in order to obtain a calcia adequate for being mixed with the specific additive of the present application.

If the calcining temperature is below 800° C., the resultant calcia exhibits a poor filling property and, therefore, the resultant calcia clinker exhibits a poor resistance to slaking. Also, if the calcining temperature is higher than 1300° C., the resultant calcia clinker exhibits a poor resistance to slaking.

The calcining temperature is variable depending on the type of the lime material and the type and amount of the additive to be admixed with the resultant calcia. For example, when the lime material comprises mainly $CaCO_3$, it is preferable that the calcining temperature is in the range of from 1100° to 1300° C. When the resultant calcia is mixed with the additive in the presence of water, it is preferable that the calcining temperature is about 1000° C. When the lime material comprises mainly $Ca(OH)_2$, it is preferable that the calcining temperature is in the range of from 900° to 1300° C. When the resultant calcia is mixed with an additive in the presence of water, the calcining temperature is preferable 800° C.

The calcia is admixed with an additive which comprises (A) 0.5 to 3% by weight, in terms of oxide and based on the weight of CaO contained in the calcia, of a first component and (B) 0.5 to 2% by weight, based on the weight of CaO contained in the calcia, of a second component. The first component consists of at least one inorganic compound of an element selected from those in Groups III and IV in the Periodic Table, for example, B, Al, Ga, Sc, Y, Si, Ge, Sn, Pb, Ti, Zr, and Hf. The second component consists of at least one member selected from the group consisting of (a) calcium fluoride, $CaF_2$, and (b) inorganic compounds of the elements in Groups III and IV in the Periodic Table, different from that of the first component. Usually, the compounds to be contained in the additive are subjected to the sintering procedure at an elevated temperature. Therefore, the compounds are preferably in the form of oxides, for example, $Al_2O_3$, $B_2O_3$, $TiO_3$ or $SiO_2$. The calcium fluoride may be in the form of an industrial fluorite or fluorpar.

The first component is used in an amount of from 0.5 to 3.0% by weight, in terms of oxide, based on the weight of CaO contained in the calcia. When the content of the first component is less than 0.5% by weight, the resultant calcia clinker exhibits an unsatisfactory resistance to slaking and modulus of rupture. Also, addition of the first component in an amount of more than 3% by weight, is not effective for increasing the resistance to slaking and the modulus of rupture at elevated temperatures of the resultant calcia clinker.

The second component is used in an amount of from 0.5 to 2.0% by weight based on the weight of CaO in the calcia. When the amount of the second component is less than 0.5% by weight, the resultant calcia clinker exhibits a poor resistance to slaking. Also, addition of the second component in an amount of more than 2.0% by weight, well result in a reduced resistance to slaking and in a decreased modulus of rupture.

The admixture of the calcia and the additive should be in the form of finely pulverized particles having a specific surface area of 5,000 $cm^2/g$ or more determined by the Blaine permeability method. When the specific surface area of the admixture particles is less than 5,000 $cm^2/g$, the resultant calcia clinker exhibits a poor resistance to slaking.

The finely pulverized admixture may be prepared by mixing and by finely pulverizing a non-pulverized calcia and a non-pulverized additive by using a usual pulverizing machine, for example, a ball mill. Otherwise, the non-pulverized calcia and the non-pulverized additive may be finely pulverized separately from each other, and, then, mixed together by using a usual mixer, for example a V type mixer. The above-mentioned mixing procedure may be carried out either in a dry condition or in the presence of water. The finely pulverized calcia hydrate may be the finely pulverized additive. Alternatively, after mixing a finely pulverized additive with a finely pulverized calcia, the calcia is converted into its hydrate.

The finely pulverized admixture of the calcia and the additive is preferably subjected to a shaping procedure. This shaping procedure is effective for enhancing the resistance to slaking of the resultant calcia clinker. For the shaping procedure, a brick-making machine or tablet machine may be used.

The shaped, or non-shaped, admixture is sintered at a relatively low temperature of from 1200° to 1650° C. in comparison with the conventional sintering temperature. The sintering temperature lower than 1200° C. will result in an incomplete sintering effect and cause the resultant calcia clinker to exhibit a poor resistance to slaking. Also, the sintering temperature higher than 1650° C. will result in an unsatisfactory resistance to slaking of the resultant calcia clinker, because the resultant clinker becomes porous due to sublimation of the added compounds, such as calcium fluoride.

When the additive consists of two or more inorganic compounds of the elements of Groups III and IV in the Periodic Table, it is preferable that the sintering temperature is in a range of from 1400° to 1650° C.

The process of the present invention can provide a calcia clinker having an enhanced resistance to slaking and an enhanced modulus of rupture at elevated temperatures, in comparison with those of the conventional calcia clinker, while the sintering procedure is carried out at a lower temperature than that of the conventional processes.

The following examples are prepared for the purpose of clarifying the present invention. However, it should be understood that these are intended only to be examples of the present invention and are not intended to limit the scope of the present invention in any way.

In the examples, the degree of resistance to slaking of the resultant calcia clinker was determined as follows.

The resultant calcia clinker was crushed to form granules having a size of 2 to 3 mm. The crushed clinker was treated with water in an autoclave under a pressure of 3 $kg/cm^2$ for 2 hours. The degree of resistance to slaking of the clinker was represented by the increase (%) in weight of the clinker, based on the original weight thereof.

The modulus of rupture at elevated temperatures of the resultant calcia clinker was determined as follows. The clinker was crushed so that the crushed product was composed of 30% by weight of the granules having a size of 150 to 297 microns, 15% by weight of the granules having a size of 149 to 75 microns and 55% by weight of the granules having a size less than 75 microns. The crushed clinker was shaped into a test piece having dimensions of 25×25×120 mm under a pressure of 500 $kg/cm^2$, and, then, burned at a temperature of 1700° C. for one hour. The test piece was subjected to a modulus of rupture test at a temperature of 1450° C. The modulus of rupture of the test piece is indicated in the unit of $kg/cm^2$.

EXAMPLES 1 THROUGH 4

Limestone was calcined at a temperature of 1200° C. for three hours. The resultant calcia had a composition as indicated in Table 1.

TABLE 1

| Component | CaO | MgO | $SiO_2$ | $Al_2O_3$ | $Fe_2O_3$ | Total |
|---|---|---|---|---|---|---|
| Content (% by weight) | 99.4 | 0.3 | 0.1 | 0.1 | 0.1 | 100.0 |

In each of the Examples 1 through 4, the calcia was admixed with the compounds in the amount as indicated in Table 2. The admixture was finely pulverized by using a ball mill to an extent that the resultant fine particles exhibited a specific surface area of 6000 $cm^2/g$ determined by the Blaine permeability method. The pulverized admixture was molded into disks having a diameter of 6 cm and a thickness of 2 cm, under a pressure of 2 $t/cm^2$. The disks were crushed into granules having a size of 5 mm or less. The granules were sintered at a temperature of 1600° C. for one hour and, then, cooled to the ambient temperature at a cooling rate of 600° C./hr. The properties of the resultant calcia clinkers of Examples 1 through 4 are indicated in Table 2.

TABLE 2

| | Composition of additive | | | | Calcia clinker | |
|---|---|---|---|---|---|---|
| | First component | | Second component | | Increase in weight due to slaking (%) | Modulus of rupture (kg/cm²) |
| Example No. | Compound | Amount (wt %) | Compound | Amount (wt %) | | |
| Example 1 | $TiO_2$ | 1 | $CaF_2$ | 1 | 1.6 | 300 |
| 2 | $SiO_2$ | 1 | $CaF_2$ | 1 | 1.9 | 290 |
| 3 | $Al_2O_3$ | 1 | $CaF_2$ | 1 | 1.7 | 280 |
| 4 | $B_2O_3$ | 1 | $CaF_2$ | 1 | 2.4 | 270 |
| Comparison example 1 | None | | | | 32.0 | 150 |
| 2 | $TiO_2$ | 1 | None | | 10.2 | 220 |
| 3 | $SiO_2$ | 1 | " | | 29.4 | 190 |
| 4 | $Al_2O_3$ | 1 | " | | 9.8 | 200 |
| 5 | $B_2O_3$ | 1 | " | | 28.2 | 160 |
| 6 | $CaF_2$ | 1 | " | | 9.7 | 190 |
| 7 | $TiO_2$ | 1 | $MgF_2$ | 1 | 17.3 | 190 |
| 8 | $TiO_2$ | 1 | NaF | 1 | 23.1 | 160 |

COMPARISON EXAMPLES 1 THROUGH 6

In each of the Comparison Examples 1 through 6, the same procedures as those described in Example 1 were carried out, except that in Comparison Example 1 no additive was used and in each of Comparison Examples 2 through 6, the additive used had the composition as indicated in Table 2.

The results are indicated in Table 2.

COMPARISON EXAMPLES 7 AND 8

In each of the Comparison Examples 7 and 8, the same procedures as those described in Example 1 were carried out, except that the calcium fluoride, $CaF_2$, was replaced by magnesium fluoride, $MgF_2$, in Comparison Example 7 and by sodium fluoride, NaF, in Comparison Example 8.

The results are indicated in Table 2.

EXAMPLE 5

The same procedures as those described in Example 1 were carried out, except that the calcium fluoride was used in an amount of 2% by weight.

The results are indicated in Table 3.

COMPARISON EXAMPLE 9

The same procedures as those described in Example 1 were carried out, except that the calcium fluoride was used in an amount of 3.0% by weight.

The results are indicated in Table 3.

TABLE 3

| | Additive | | | | Calcia clinker | |
|---|---|---|---|---|---|---|
| | First component | | Second component | | Increase in weight due to slaking (%) | Modulus of rupture (kg/cm²) |
| Example No. | Compound | Amount (wt %) | Compound | Amount (wt %) | | |
| Example 5 | $TiO_2$ | 1 | $CaF_2$ | 2 | 1.9 | 300 |
| Comparison example 9 | $TiO_2$ | 1 | $CaF_2$ | 3 | 4.4 | 200 |

COMPARISON EXAMPLES 10 AND 11

The same procedures as those mentioned in Example 1 were carried out, except that the calcining temperature for the limestone was 750° C. in Comparison Example 10 and 1400° C. in Comparison Example 11.

The results are indicated in Table 4.

EXAMPLES 6 AND 7

The same procedures as those described in Example 1 were carried out except that the limestone was replaced by a slaked lime and the calcining temperature was 1000° C. in Example 6 and 1200° C. in Example 7.

The results are indicated in Table 4.

COMPARISON EXAMPLES 12 AND 13

The same procedures as those described in Example 6 were carried out, except that the calcining temperature was 750° C. in Comparison Example 12 and 1400° C. in Comparison Example 13.

The results are indicated in Table 4.

TABLE 4

| | | Calcining | Calcia clinker | |
| Example No. | Lime Material | Temperature (°C.) | Increase in weight due to slaking (%) | Modulus of rupture (kg/cm²) |
| --- | --- | --- | --- | --- |
| Example 1 | Limestone | 1200 | 1.6 | 300 |
| Comparison example 10 | " | 750 | 4.1 | 220 |
| 11 | " | 1400 | 2.9 | 250 |
| Example 6 | Slaked lime | 1000 | 1.5 | 310 |
| 7 | " | 1200 | 1.6 | 310 |
| Comparison example 12 | " | 750 | 3.9 | 240 |
| 13 | " | 1400 | 2.9 | 250 |

EXAMPLE 8

The same procedures as those described in Example 1 were carried out, except that the pulverized admixture had a specific surface area of 8000 cm²/g.

The result is indicated in Table 5.

COMPARISON EXAMPLE 14

The same procedures as those described in Example 1 were carried out, except that the pulverized admixture had a specific surface area of 4000 cm²/g.

The result is indicated in Table 5.

TABLE 5

| | | Calcia clinker | |
| Example No. | Specific surface area (cm²/g) | Increase in weight due to slaking (%) | Modulus of rupture (kg/cm²) |
| --- | --- | --- | --- |
| Example 8 | 8000 | 1.7 | 310 |
| Comparison example 14 | 4000 | 5.8 | 180 |

EXAMPLES 9 AND 10

The same procedures as those described in Example 1 were carried out, except that the sintering temperature was 1400° C. in Example 9 and 1200° C. in Example 10.

The results are indicated in Table 6.

COMPARISON EXAMPLES 15 AND 16

The same procedures as those mentioned in Example 1 were carried out, except that the sintering temperature was 1800° C. in Comparison Example 15 and 1000° C. in Comparison Example 16.

The results are indicated in Table 6.

TABLE 6

| | | Calcia clinker | |
| Example No. | Sintering temperature (°C.) | Increase in weight due to slaking (%) | Modulus of rupture (kg/cm²) |
| --- | --- | --- | --- |
| Example 9 | 1400 | 1.9 | 290 |
| 10 | 1200 | 2.5 | 270 |
| Comparison example 15 | 1800 | 5.4 | 200 |
| 16 | 1000 | 30.0 | 180 |

EXAMPLES 11 AND 12

In Example 11, a limestone was calcined at a temperature of 1000° C. for 5 hours. The resulting calcia had the composition indicated in Table 7.

TABLE 7

| Compound | CaO | MgO | SiO₂ | Al₂O₃ | Fe₂O₃ | Total |
| --- | --- | --- | --- | --- | --- | --- |
| Content (wt %) | 99.4 | 0.3 | 0.1 | 0.1 | 0.1 | 100.0 |

757 g of the calcia was suspended in 4243 g of water to provide an aqueous slurry of about 20% by weight of the slaked lime.

The same additive as that described in Example 1 was suspended in the same amount as that mentioned in Example 1 in the slaked lime slurry. The slurry was stirred by using a stirrer for 2 hours. The solid particles were separated from the slurry by means of filtration. The separated solid particles in an amount of 1016 g had a specific surface area of 6000 cm²/g. The solid particles were dried at a temperature of 105° C. for 4 hours and then, molded into rods having a width of 4 cm, a length of 4 cm and a height of 8 cm, under a pressure of 0.5 t/cm². The rods were crushed into granules having a size of 5 mm or less. The granules were sintered at a temperature of 1600° C. for one hour.

In Example 12, the same procedures as those described in Example 11 were carried out except that the sintering temperature was 1200° C. The properties of the resultant calcia clinkers of Examples 11 and 12 are as indicated in Table 8.

TABLE 8

| | | Calcia clinker | |
| Example No. | Sintering temperature (°C.) | Increase in weight due to slaking (%) | Modulus of rupture (kg/cm²) |
| --- | --- | --- | --- |
| Example 11 | 1600 | 2.3 | 290 |
| Example 12 | 1200 | 2.4 | 280 |

EXAMPLES 13 THROUGH 18

In each of the Examples 13 through 18, the same procedures as those described in Example 1 were carried out, except that the additive used had a composition as indicated in Table 9.

The results are indicated in Table 9.

TABLE 9

| Example No. | Additive First component Compound | Amount (wt %) | Second component Compound | Amount (wt %) | Calcia clinker Increase in weight due to slaking (%) | Modulus of rupture (kg/cm$^2$) |
|---|---|---|---|---|---|---|
| 13 | Al$_2$O$_3$ | 1 | SiO$_2$ | 1 | 1.8 | 280 |
| 14 | SiO$_2$ | 1 | TiO$_2$ | 1 | 2.0 | 300 |
| 15 | TiO$_2$ | 1 | Al$_2$O$_3$ | 1 | 2.1 | 290 |
| 16 | B$_2$O$_3$ | 1 | SiO$_2$ | 1 | 2.8 | 270 |
| 17 | Al$_2$O$_3$ | 0.5 | SiO$_2$ | 0.5 | 2.4 | 230 |
| 18 | Al$_2$O$_3$ | 2 | SiO$_2$ | 2 | 1.8 | 270 |

COMPARISON EXAMPLES 17 AND 18

The same procedures as those described in Example 13 were carried out, except that the calcining temperature applied to the limestone was 750° C. in Comparison Example 17 and 1400° C. in Comparison Example 18. The results are indicated in Table 10.

TABLE 10

| Comparison Example No. | Calcining temperature °C. | Calcia clinker Increase in weight due to slaking (%) | Modulus of rupture (kg/cm$^2$) |
|---|---|---|---|
| 17 | 750 | 4.0 | 200 |
| 18 | 1400 | 3.3 | 220 |

EXAMPLE 19 AND COMPARISON EXAMPLE 19

The same procedures as those described in Example 13 were carried out, except that the pulverized admixture had a specific surface area of 8000 cm$^2$/g in Example 19 and 4000 cm$^2$/g in Comparison Example 19. The results are indicated in Table 11.

TABLE 11

| Example No. | Specific surface area (cm$^2$/g) | Calcia clinker Increase in weight due to slaking (%) | Modulus of rupture |
|---|---|---|---|
| Example 19 | 8000 | 1.8 | 290 |
| Comparison example 19 | 4000 | 6.2 | 170 |

EXAMPLES 20 AND 21 AND COMPARISON EXAMPLE 20

In each of the examples 20 and 21 and Comparison Example 20, the same procedures as those described in Example 13 were carried out, except that the sintering temperature was as indicated in Table 12. The results are indicated in Table 12.

TABLE 12

| Example No. | Sintering temperature (°C.) | Calcia clinker Increase in weight due to slaking (%) | Modulus of rupture (kg/cm$^2$) |
|---|---|---|---|
| Example 20 | 1400 | 2.3 | 270 |
| 21 | 1800 | 2.0 | 270 |
| Comparison example 20 | 1150 | 4.0 | 230 |

EXAMPLES 22 AND 23 AND COMPARISON EXAMPLE 21

In each of the Examples 22 and 23 and Comparison Example 21, the same procedures as those described in Example 13 were carried out, except that the first component consisted of 1% by weight of Al$_2$O$_3$ and 1% by weight of SiO$_2$ and the second component consisted of CaF$_2$ in the amount as indicated in Table 13. The results are indicated in Table 13.

TABLE 13

| Example No. | Additive First component Compounds and amounts (wt %) | Second component Compound | Amount (wt %) | Calcia clinker Increase in weight due to slaking (%) | Modulus of rupture (kg/cm$^2$) |
|---|---|---|---|---|---|
| Example 22 | Al$_2$O$_3$:1 and SiO$_2$:1 | CaF$_2$ | 1 | 1.5 | 280 |
| 23 | Al$_2$O$_3$:1 and SiO$_2$:1 | " | 2 | 1.8 | 270 |
| Comparison example 21 | Al$_2$O$_3$:1 and SiO$_2$:1 | " | 3 | 5.2 | 190 |

EXAMPLES 24 AND 25 AND COMPARISON EXAMPLE 22

In each of the Examples 24 and 25 and Comparison Example 22, the same procedures as those described in Example 22 were carried out, except that the sintering procedure was carried out at the temperature as indicated in Table 14. The results are indicated in Table 14.

TABLE 14

| Example No. | Sintering temperature (°C.) | Calcia clinker Increase in weight due to slaking (%) | Modulus of rupture (kg/cm$^2$) |
|---|---|---|---|
| Example 24 | 1400 | 1.8 | 270 |
| 25 | 1200 | 2.3 | 260 |
| Comparison example 22 | 1800 | 9.4 | 170 |

EXAMPLE 26

The same procedures as those described in Example 13 were carried out, except that the first component consisted of 1% by weight of Al$_2$O$_3$ and the second component consisted of 1% by weight of SiO$_2$ and 1% by weight of $TiO_2$. The resultant calcia clinker exhibited an increase in weight due to slaking of 1.8% and a modulus of rupture of 270 kg/cm$^2$.

EXAMPLES 27 AND 28

The same procedures as those described in Example 11 were conducted, except that the calcining procedure at a temperature of 1000° C. was carried out for 5 hours, the additive was the same as that described in Example 13, the sintering temperature was 1600° C. in Example 27 and 1200° C. in Example 28, and the specific surface area of the admixture was 6000 cm$^2$/g in Example 27 and 6000 cm$^2$/g in Example 28. The results are indicated in Table 15.

TABLE 15

| | | Calcia clinker | |
|---|---|---|---|
| Example No. | Sintering temperature (°C.) | Increase in weight due to slaking (%) | Modulus of rupture (kg/cm$^2$) |
| 27 | 1600 | 2.6 | 270 |
| 28 | 1200 | 2.5 | 260 |

EXAMPLE 29

Procedures identical to those described in Example 13 were carried out, except that the limestone was replaced by gypsum, the calcining operation was carried out at a temperature of 1200° C. for 3 hours with a reducing atmosphere and the resultant calcia had the composition as indicated in Table 16.

TABLE 16

| Component | CaO | MgO | SiO$_2$ | Al$_2$O$_3$ | Fe$_2$O$_3$ | Total |
|---|---|---|---|---|---|---|
| Content (wt %) | 99.5 | 0.3 | 0.1 | 0.1 | 0.0 | 100.0 |

The resultant calcia clinker exhibited an increase in weight due to slaking of 2.0% and a modulus of rupture of 270 kg/cm$^2$.

COMPARISON EXAMPLES 23 THROUGH 26

In comparison Example 23, a calcia clinker was prepared in accordance with the method of Japanese Patent Application Publication No. 50-27203. 98.9 parts by weight of a limestone consisting of 55.5% by weight of CaO, 0.3% by weight of MgO, 0.1% by weight of SiO$_2$, 0.1% by weight of Al$_2$O$_3$, 0.1% by weight of Fe$_2$O$_3$, 0.01% by weight of Na$_2$O, 0.01% by weight of K$_2$O and 43.9% by weight of ignition loss, were mixed with 0.55 parts by weight of SiO$_2$ and 0.55 parts by weight of Fe$_2$O$_3$ which correspond to 1% based on the weight of CaO in the limestone.

The mixture was pulverized to an extent that 95% by weight or more of the pulverized mixture could pass though a 88 micron siene. 36 kg of the pulverized mixture was placed in an arc type electric furnace having an inside diameter of 250 mm and a depth of 250 mm and lined with a refractory calcia material, and melted at a temperature of 3000° C. for 3 hours by using three carbon electrodes each having a diameter of 35 mm under a voltage of 150 V at a current of 100 A. Thereafter, the melted mixture was cooled at a cooling rate of 600° C./hour by changing the voltage and current. 20 kg of solid calcia material were obtained. The resistance to slaking and modulus of rupture of the solid calcia material are indicated in Table 17.

In Comparison Example 24, a calcia clinker was produced by the method disclosed in Japanese Patent Application Laid-open No. 52-53908. The same limestone as that described in Comparison Example 23 was crushed into lumps having a size of from 10 to 20 mm. 1.50 kg of the crushed limestone were placed in a calcia pot having an inside diameter of 120 mm and a depth of 150 mm and the pot was placed in a gas furance. The limestone lumps were heated at a temperature of 1800° C. for 3 hours and, then, cooled at a cooling rate of 60° C./hour. 0.83 kg of calcia clinker were obtained. The calcia clinker contained 98.9% by weight of CaO which is in the form of crystals having a size of 10 microns. The properties of the calcia clinker are indicated in Table 17.

In Comparison Example 25, a calcia clinker was produced by the method disclosed in Japanese Patent Application Laid-open No. 53-55311. A mixture was prepared from 100 parts by weight of the same limestone as that mentioned in Comparison Example 23, mixed with 1.6 parts by weight of Fe$_2$O$_3$ which corresponds to 2.8% based on the weight of CaO in the limestone. The mixture was pulverized into particles having a size of 3 mm or less. 1.50 kg of the pulverized mixture were placed in a calcia pot having an inside diameter of 120 mm and a depth of 150 mm and heated at a temperature of 1700° C. for one hour by using a gas furnace. Thereafter, the mixture was cooled at a cooling rate of 600° C./hour. 0.83 kg of calcia clinker were obtained. The properties of the calcia clinker are indicated in Table 17.

In Comparison Example 26, a calcia clinker was produced by the method as described in Japanese Patent Application Laid-open No. 50-14709. A mixture was provided from, 100 parts by weight of the same limestone as that mentioned in Comparison Example 23 mixed with 0.55 parts by weight of SiO$_2$ which corresponds to 1% based on the weight of CaO in the limestone, and 2.22 parts by weight of Fe$_2$O$_3$ which corresponds to 4% based on the weight of CaO in the limestone. The mixture was pulverized into particles having a size of 3 mm or less. 1.50 kg of the pulverized mixture were placed in a calcia pot having an inside diameter of 120 mm and a depth of 150 mm and the pot was placed in a gas furnace and heated at a temperature of 1700° C. for one hour. The pot was cooled at a cooling rate of 600° C./hour. 0.83 kg of calcia clinker were obtained. The properties of the clinker are indicated in Table 17.

The results of Comparison Examples 23 through 26 are indicated in Table 17 in comparison with those of Examples 1 and 13.

TABLE 17

| | | | | Calcia clinker | |
|---|---|---|---|---|---|
| Example No. | Additive Compound and amount (wt. %) | Sintering temperature (°C.) | Cooling rate (°C./hr) | Increase in weight due to slaking (%) | Modulus of rupture (kg/cm$^2$) |
| Example 1 | TiO$_2$:1 and CaF$_2$:1 | 1600 | 600 | 1.6 | 300 |
| 13 | Al$_2$O$_3$:1 and SiO$_2$:1 | 1600 | 600 | 1.8 | 280 |
| Comparison | | | | | |

TABLE 17-continued

| Example No. | Additive Compound and amount (wt. %) | Sintering temperature (°C.) | Cooling rate (°C./hr) | Calcia clinker Increase in weight due to slaking (%) | Modulus of rupture (kg/cm$^2$) |
|---|---|---|---|---|---|
| 23 | SiO$_2$:1 and Fe$_2$O$_3$:1 | 3000 | 600 | 10.8 | 80 |
| 24 | none | 1800 | 60 | 14.2 | 40 |
| 25 | Fe$_2$O$_3$:2.8 | 1700 | 600 | 9.1 | 20 |
| 26 | SiO$_2$:1 and Fe$_2$O$_3$:4 | 1700 | 600 | 12.1 | 15 |

We claim:

1. A process for producing a calcia clinker comprising:
   calcining a lime material comprising mainly at least one calcium compound at a temperature of 800° C. to 1300° to provide a calcia;
   preparing an admixture of (1) said calcia and (2) an additive comprising (A) 0.5 to 3% by weight, in terms of oxide and based on the weight of CaO contained in said calcia, of a first component of at least one inorganic compound containing an element selected from the group consisting of titanium, aluminum and silicon and (B) 0.5 to 2% by weight, based on the weight of CaO contained in said calcia, of a second component consisting of calcium fluoride, said admixture being in the form of fine particles having a specific surface area of at least 5,000 cm$^2$/g determined by the Blaine permeability method, and;
   sintering said admixture at a temperature of from 1200° to 1650° C.

2. The process as claimed in claim 1, wherein said calcium compound is selected from the group consisting of CaCO$_3$ and Ca(OH)$_2$.

3. The process as claimed in claim 1, wherein said inorganic compound in said first component is selected from Al$_2$O$_3$, TiO$_2$ and SiO$_2$.

4. The process as claimed in claim 1, wherein said admixture is prepared by mixing said calcia and said additive and finely pulverizing said mixture.

5. The process of claim 1, wherein said admixture, in the form of fine particles, is shaped into a desired form and the shaped admixture is subjected to the sintering procedure.

6. A calcia clinker which has been produced by preparing an admixture, in the form of fine particles having a specific surface area of at least 5,000 cm$^2$/g determined by the Blaine permeability method, of (1) calcia which has been prepared by calcining a lime material comprising mainly at least one calcium compound at a temperature of 800° C. to 1300° C., and (2) an additive comprising (A) 0.5 to 3% by weight, in terms of oxide and based on the weight of CaO contained in said calcia, of a first component consisting of at least one inorganic compound containing an element selected from the group consisting of titanium, aluminum and silicon and, (B) 0.5 to 2% by weight, based on the weight of CaO contained in said calcia, of calcium fluoride; and
sintering said admixture at a temperature of from 1200° to 1650° C.

* * * * *

UNITED STATES PATENT AND TRADEMARK OFFICE
CERTIFICATE OF CORRECTION

PATENT NO. : 4,366,257

DATED : December 28, 1982

INVENTOR(S) : Y. Suzukawa, et al.

It is certified that error appears in the above-identified patent and that said Letters Patent is hereby corrected as shown below:

Column 3, line 54: "well" should read --will--

Column 12, line 16: "furance" should read --furnace--

Signed and Sealed this

Twentieth Day of September 1983

[SEAL]

Attest:

GERALD J. MOSSINGHOFF

Attesting Officer     Commissioner of Patents and Trademarks